United States Patent [19]

Faulkner

[11] Patent Number: 4,896,501

[45] Date of Patent: Jan. 30, 1990

[54] TURBOJET ENGINE WITH SONIC INJECTION AFTERBURNER

[76] Inventor: Robie L. Faulkner, 4138 Udall St., San Diego, Calif. 92107

[21] Appl. No.: 111,305

[22] Filed: Oct. 22, 1987

[51] Int. Cl.[4] ............................................. F02K 3/10
[52] U.S. Cl. ...................................... 60/261; 60/264
[58] Field of Search ............... 60/261, 262, 263, 749, 60/241, 243, 39.17, 246, 264

[56] References Cited

U.S. PATENT DOCUMENTS

| | | | |
|---|---|---|---|
| 2,673,445 | 3/1954 | Bruckmann | 60/261 |
| 2,929,201 | 3/1960 | Lindsey | 60/261 |
| 3,063,239 | 11/1962 | Jensen et al. | 60/241 |
| 3,352,112 | 11/1967 | Chase | 60/261 |
| 3,626,698 | 12/1971 | Baum | 60/261 |
| 3,633,361 | 1/1972 | Bauger et al. | 60/261 |
| 3,712,062 | 1/1973 | Nash | 60/261 |
| 4,072,008 | 2/1978 | Kenworthy et al. | 60/261 |
| 4,448,019 | 5/1984 | Klees | 60/39.17 |
| 4,509,324 | 4/1985 | Urbach et al. | 60/39.17 |

FOREIGN PATENT DOCUMENTS 749009 5/1956 United Kingdom ................. 60/261

Primary Examiner—Donald E. Stout

[57] ABSTRACT

A propulsion system having an afterburning turbojet with turbine bypass ducts in which the afterburner fuel is added. The hot gas products and fuel mixture enters the afterburner at sonic velocity. The turbojet turbine bypass has a flow control connected to the exit of the combustor to control the amount of turbine bypass flow.

12 Claims, 1 Drawing Sheet

TURBOJET ENGINE WITH SONIC INJECTION AFTERBURNER

BACKGROUND OF THE INVENTION

This invention relates to afterburning turbojet engines for use in lower thrust applications such as missiles and light aircraft. In these applications the additional thrust available from a lightweight compact augmentor system is very desirable.

This invention provides an afterburning turbojet engine without the use of flameholders and fuel spray bar systems. The afterburner fuel flow is sprayed into several small turbine bypass injection ducts which connect the main combustion chamber to the forward portion of the afterburner. The relatively high pressure drop between the main combustion chamber and the afterburner creates sonic velocity jets of hot gas and fuel mixture which enter the afterburner in a tangential manner and mix with the turbine discharge gas products.

The tangential entry of the jets creates a fuel-rich jet vortex stabilization mechanism in the forward portion of the afterburner duct. Flame speed is increased in this hot jet induced vortex and the length required to complete the combustion process is minimised.

BRIEF DESCRIPTION OF THE DRAWINGS

The subject invention may best be understood by reference to the following description taken in connection with the accompanying drawing in which.

DETAILED DESCRIPTION OF THE INVENTION

Figure 1:
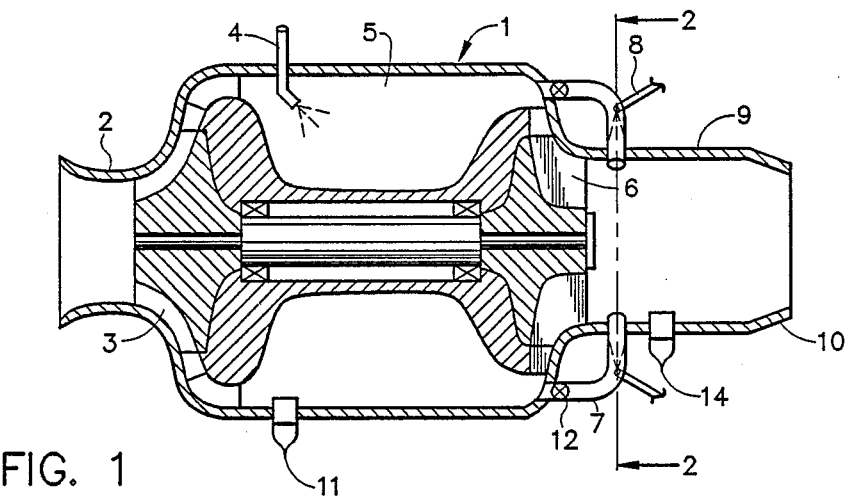
FIG. 1 is a cross-sectional side view of an afterburning turbojet engine incorporating the improvements of the invention.
Figure 2:
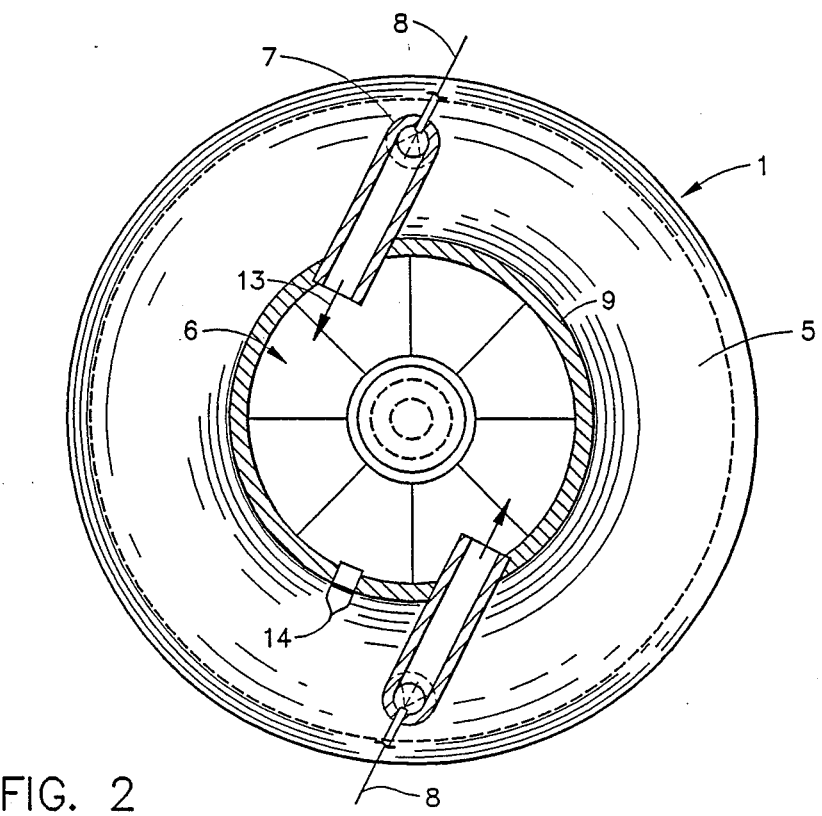
FIG. 2 is a sectional view taken alone line 2—2 of FIG. 1.

Reference is made to the drawings in FIG. 1 and FIG. 2 which show an afterburner turbojet engine 1 having an inlet duct 2, a compressor 3, a main combustion chamber 5, main combustion chamber fuel injectors 4, a main ignitor 11, a turbine 6, turbine bypass ducts 7, afterburner fuel injectors 8, afterburner duct 9, afterburner exit nozzle 10, turbine bypass duct control valves 12 and afterburner ignitor 14. The main combustion chamber is connected between the compressor 3, and the turbine 6 and uses a conventional ignitor 11 and fuel injectors 4. Turbine bypass ducts 7 are connected between the main combustion chamber 5 and the afterburner duct 9. The afterburner fuel is sprayed into the turbine bypass ducts 7 through afterburner fuel injectors 8. The hot main combustor gas and fuel air mixture discharges from the turbine bypass ducts 7 into the afterburner duct 9 in the form of high or supersonic velocity tangential jets 13 where it mixes with the turbine discharge gas. A portion of the oxygen in the gas leaving the main combustion chamber 5 supports the combustion of fuel in the afterburner. The level of fuel air ratio in the afterburner duct is dependent upon the amount of thrust required and the oxygen concentration of the gas leaving combustion chamber 5.

The tangential entry of the high or supersonic velocity jets 13 which contain hot gas products and fuel air mixture creates a fuel-rich vortex stabilization mechanism in the forward portion of the afterburner duct 9. The flame speed is enhanced in the hot jet induced vortex. The length requirement is reduced to mix and complete the combustion process prior to discharge through the exit nozzle 10. The high or supersonic velocity jets 13 created by the two turbine bypass ducts 7 can be arranged opposite each other on the afterburner duct 9, the discharge from each enters opposite one another to form opposed jets in the main afterburner duct 9. The impingement of the jets forms a bluff body afterburner flame stabilizing mechanism which allows the combustion process to be completed prior to discharge through exit nozzle 10. Some applications may require an afterburner ignitor 14, partial flame holder and control valves 12 in the turbine bypass ducts 7. Some applications will have turbine exhaust or turbine bypass duct 7 gas temperatures high enough to ignite the fuel air mixture but other applications will require an afterburner ignitor 14. Some applications may require that some or all of the afterburner fuel be added within the afterburner duct 9 through conventional turbojet afterburner fuel spray rings located upstream of the turbine bypass ducts 7 which discharge into the afterburner duct 9. The fuel is then burnt in the vortex stabilization region formed by the tangential entry of the high or supersonic velocity jets 13 into the afterburner duct 9. Some applications may require that the fuel sprayed through conventional afterburner spray rings in the afterburner duct 9 be burnt using a bluff body flame stabilization mechanism. This is created by the discharge of the two turbine bypass ducts into the afterburner duct 9 where each enters opposite one another. There is thus provided a turbojet engine with a compact afterburner for use in missiles and light aircraft.

I claim:

1. A turbojet engine including:
   a compressor for supplying compressed gas to a combustion chamber;
   a turbine mechanically coupled to said compressor for receiving hot combustion chamber gases from a combustion chamber and for discharging turbine discharge gas to an afterburner duct;
   a combustion chamber interconnecting the output of said compressor and the input of said turbine;
   combustion chamber fuel supplying means for supplying fuel to said combustion chamber such that the fuel is mixed with the compressed gas;
   means for igniting the fuel/compressed gas mixture in said combustion chamber such that hot combustion chamber gases are formed;
   an afterburner duct connected to the output of said turbine for receiving turbine discharge gas;
   a turbine bypass duct connecting said combustion chamber with said afterburner duct for receiving hot combustion chamber gases from said combustion chamber and for injecting them as a gas jet into said afterburner duct;
   turbine bypass duct fuel supplying means for supplying fuel to the hot combustion chamber gases passing through said turbine bypass duct; and
   means for igniting the combined fuel/hot combustion chamber gases passing through said turbine bypass duct for combustion in said afterburner duct.

2. The turbojet engine of claim 1 wherein:
   said gas jet from said turbine bypass duct tangentially enters said afterburner duct.

3. The turbojet engine of claim 1 wherein:
   there is a plurality of said turbine bypass ducts; and said gas jet from each said turbine bypass duct enters said afterburner duct normal to the flow of the turbine discharge gas through said afterburner duct.

4. The turbojet engine of claim 1 wherein:

there are two turbine bypass ducts; and said gas jet from each said turbine bypass duct enters into said afterburner duct from opposite sides of said afterburner duct and normal to the flow of the turbine discharge gas through said afterburner duct.

5. The turbojet engine of claim 1 wherein:

said gas jet enters said afterburner duct at supersonic velocity.

6. The turbojet engine of claim 1 wherein:

said gas jet enters said afterburner duct at velocities at or lower than the speed of sound.

7. The turbojet engine of claim 1 further including:

regulating means for controlling the amount of flow of gases through said turbine bypass ducts.

8. The turbojet engine of claim 1 further including:

means for supplying fuel to said afterburner duct upstream in the flow of turbine discharge gas of the discharge of said gas jets from said turbine bypass ducts.

9. A turbojet engine including:

a compressor for supplying compressed gas to a combustion chamber;

a turbine mechanically coupled to said compressor for receiving hot combustion chamber gases from a combustion chamber and for discharging turbine discharge gas to an afterburner duct;

a combustion chamber interconnecting the output of said compressor and the input of said turbine;

combustion chamber fuel supplying means for supplying fuel to said combustion chamber such that it is mixed with the compressed gas;

means for igniting the fuel/compressed gas mixture in said combustion chamber such that hot combustion chamber gases are formed;

an afterburner duct connected to the output of said turbine for receiving turbine discharge gas;

a turbine bypass duct connecting said combustion chamber with said afterburner duct for receiving hot combustion chamber gases from said combustion chamber including means for injecting said gases as a gas jet into said afterburner duct normal to the flow of the received turbine discharge gas such that the gas jet acts as a bluff body flame stabilizing mechanism within the received turbine discharge gas in said afterburner duct.

10. The turbojet engine of claim 9 further including:

turbine bypass duct fuel supplying means for supplying fuel to the hot combustion chamber gases passing thru said turbine bypass duct; and means for igniting the combined fuel/hot combustion chamber gases passing thru said turbine bypass duct for combustion in said afterburner duct.

11. The turbojet engine of claim 9 wherein:

said injected hot gases are fuel rich.

12. A turbojet engine including:

a compressor for supplying compressed gas to a combustion chamber;

a turbine mechanically coupled to said compressor for receiving hot combustion chamber gases from a combustion chamber and for discharging turbine discharge gas to an afterburner duct;

a combustion chamber interconnecting the output of said compressor and the input of said turbine;

combustion chamber fuel supplying means for supplying fuel to said combustion chamber such that it is mixed with the compressed gas;

means for igniting the fuel/compressed gas mixture in said combustion chamber such that hot combustion chamber gases are formed;

an afterburner duct connected to the output of said turbine for receiving turbine discharge gas;

a turbine bypass duct connecting said combustion chamber with said afterburner duct for receiving hot combustion chamber gases from said combustion chamber and for tangentially injecting the hot gases at high speed into said afterburner duct such that a flame stabilizing vortex is created of said injected gases and said received turbine discharge gas.

* * * * *